United States Patent [19]

Rohr

[11] 4,420,190

[45] Dec. 13, 1983

[54] CAST VEHICLE WHEEL

[75] Inventor: Jakob Rohr, Schaffhausen, Switzerland

[73] Assignee: George Fischer Ltd., Switzerland

[21] Appl. No.: 318,941

[22] Filed: Nov. 6, 1981

[30] Foreign Application Priority Data

Nov. 13, 1980 [CH] Switzerland ............... 8420/80

[51] Int. Cl.³ ............................................. B60B 3/06
[52] U.S. Cl. ................................. 301/63 R; 301/65; 301/97; 152/381.3
[58] Field of Search ............ 301/5 UH, 6 CS, 11 R, 301/12 R, 13 R, 13 SM, 63 R, 63 PW, 63 D, 65, 95–98; 29/159.1, 159.01; 164/DIG. 14; 249/56; 152/427–428, 378 R, 381.3–381.6

[56] References Cited

U.S. PATENT DOCUMENTS 3,799,618  3/1974  Martinoli ..................... 301/5 B
4,106,172  8/1978  Bache ........................... 301/63 X

FOREIGN PATENT DOCUMENTS 2442785  4/1975  Fed. Rep. of Germany .

Primary Examiner—Charles A. Marmor
Attorney, Agent, or Firm—Roylance, Abrams, Berdo & Farley

[57] ABSTRACT

A cast, one-piece vehicle wheel is made such that the wheel pan with hand-holes passing through it is fastened to the rim such that the intermediate parts of the pan abut on the shoulder, which is formed on the side adjacent the offset wheel pan, and the shoulder extends by lobes in the direction of the drop-center. In the areas of the rim corresponding to hand-holes 10, the shoulders extends over inclined elements into the drop-center.

8 Claims, 4 Drawing Figures

CAST VEHICLE WHEEL

This invention relates to a cast vehicle wheel of the type having a rim portion, an axially offset pan and a flat annular mounting flange on the pan, and to a process for its production.

BACKGROUND OF THE INVENTION

A vehicle wheel and the method of manufacturing the wheel is known from German OS No. 2 442 785 wherein the wheel is cast in a single piece.

As shown in the profile drawings of that specification, the wheel has a drop-center rim which has a shoulder formed between the drop-center and the 15° cone or dish surface lying adjacent to the wheel pan. This arrangement of the shoulder is a compromise between the amount of tire to be left out and the expense of the manufacturer since, on the one hand, it is more desirable to arrange the shoulder on the side of the pan (the pan being on the outside in simply tired front wheels so that when going around curves the outside wheel is then more strongly loaded or stressed, and the transverse forces run from the outside inwardly) but on the other hand the mold is more difficult and more complicated to manufacture.

With wheels wherein the pan is welded onto the completed rim, it is easy to weld the pan to the shoulder side, and thus to produce an optimum shape.

With cast wheels, however, great problems arise (insofar as the fastening of the pan onto the drop-center must be retained) since the sand mold must form a long wedge between the shoulder of the rim and the pan, which long or deep wedge cannot be formed to be sufficiently stable with the present day casting processes.

In particular, the cast element would break and deformations would occur. Furthermore, the danger of shrinkage with tight angles in the intersection between rim and pan is greater than with large angles. The use of an additional core, of sufficiently hard sand, would create additional costs.

If the pan is mounted directly on the shoulder, then an annular chamber appears, this time between the pan fastening and the drop-center, which would need to be filled by an additional core, a step which is undesirable because of the cost.

BRIEF DESCRIPTION OF THE INVENTION

Accordingly, an object of the present invention is to provide a cast wheel which is manufactured by means of a single core and but which, at the same time, allows the rim to be formed with a shoulder on the pan side.

Briefly described, the invention includes an improved cast vehicle wheel, particularly for use with tubeless tires, of the type having the unitarily formed combination of a rim portion, an axially offset pan and a flat annular flange, wherein the rim portion is a drop-center rim with conical surface portions extending outwardly from both sides thereof and with a shoulder formed between the drop-center portion and one of the conical portions, and wherein the pan interconnects the flat annular flange and the rim portions and includes means defining hand-holes therethrough, the improvement wherein the shoulder is formed between the drop-center and the one conical portion on the same side as the axially offset pan and flange, and the intermediate portions of the pan between said hand-holes are shaped to merge into said conical portion and shoulder.

In another aspect, the invention includes a process for manufacturing a wheel rim of the type having the one-piece combination of a rim portion, an axially offset pan and a flat annular flange, wherein the rim portion is a drop-center rim with conical portions extending outwardly on both sides of the drop center and with a shoulder formed between the drop-center and one of the conical portions, and wherein the pan interconnects the flat annular flange and the rim portion and includes means defining a plurality of hand-holes therethrough, and where the intermediate portions of the pan between the hand-holes are shaped to merge into the conical portion and shoulder, comprising providing a casting mold having first and second axially facing mold halves and an annular core shaped to define the radially outwardly facing surface of the the rim, and casting the wheel rim in one piece in said casting mold.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
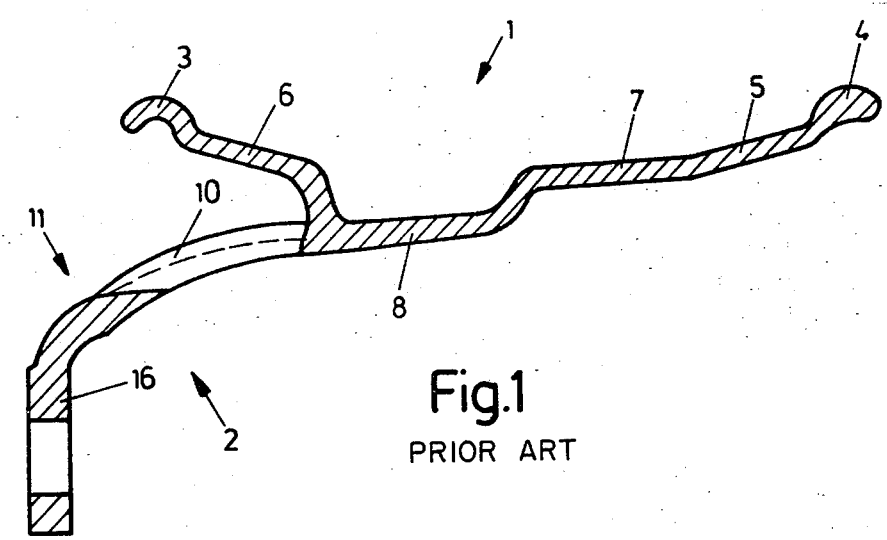
FIG. 1 is a partial side elevation, in section, of the profile of a prior art wheel.

FIG. 1 shows a known one-piece vehicle wheel in profile wherein the rim is identified by the numeral 1 and the wheel pan is identified at 2. The rim includes a left tip 3 and a right tip 4, 15° cones or dishes 5 and 6 extending inwardly from the tips, a shoulder 7 formed on the right hand 50° cone and a drop-center 8. The wheel also has an annular flange 16 which is connected with rim 1 by pan 2 which has hand-holes 10 passing through it. Intermediate portions 13 define and separate the pan holes from each other.

On this wheel, according to the present state of the art, shoulder 7 is mounted as it would be on the inside of the front wheel of the vehicle. The forces which occur when a vehicle having such a wheel is going around a curve, which forces are greater on the outside wheel (relative to the curve), increase from tip 3 to tip 4, i.e., the force is higher on 4 than 3, so that the tire bead engaging on 15° core 6, with the minimum tire pressure exceeding a threshhold value of the transverse forces, can slip into drop-center 8. This threshold value has recently been set higher by the heavy vehicle industry, so that the value which has to be exceeded before the bead disengages from the rim must be increased. If shoulder 7 engages on the other side, then this corresponds to an increase of the "drop" value. This state of affairs has been established by research and tests.

Thus, an objective of this invention is to provide a structure for a cast wheel wherein the shoulder is relocated to the pan side of the wheel, which relocation has not been possible without additional cost in the manufacturing methods used up to this time, since a durable sand mold could not be produced with a portion sufficiently pointed and long to fill up the space between the round part of the pan and the rim part consisting of the shoulder and the 15° cone, but rather the mold would necessitate the use of a separate annular core.

Figure 2A:
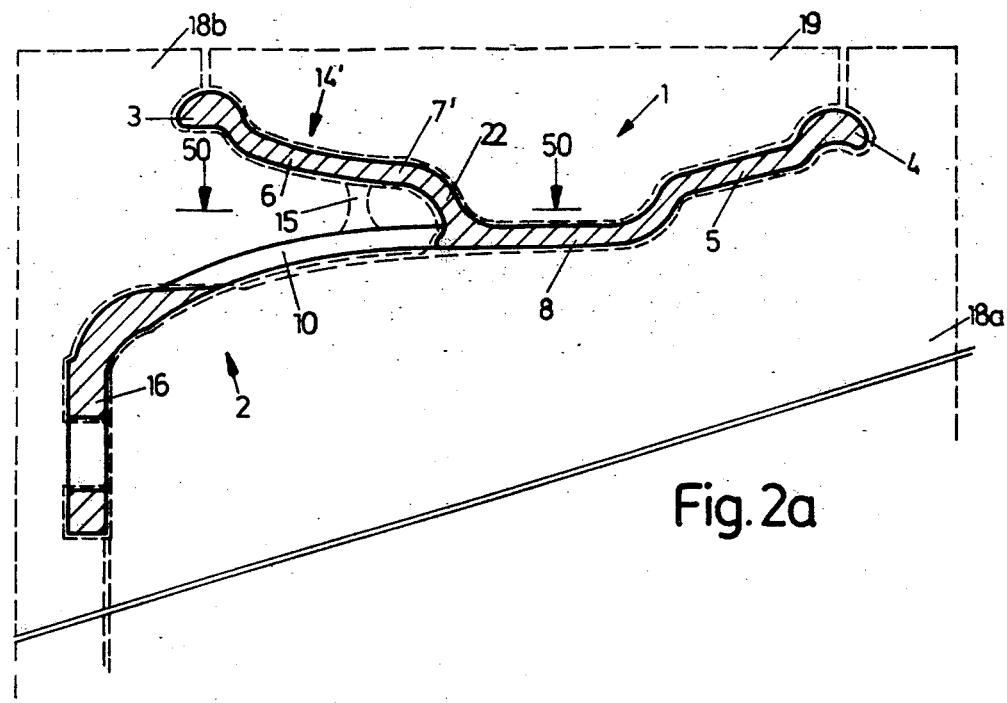
FIG. 2A is a partial side elevation, in section, of a wheel in accordance with the present invention, schematically illustrating the shape of a sand mold structure for making same, the section being taken along line 52—52 of FIG. 3.
Figure 2B:
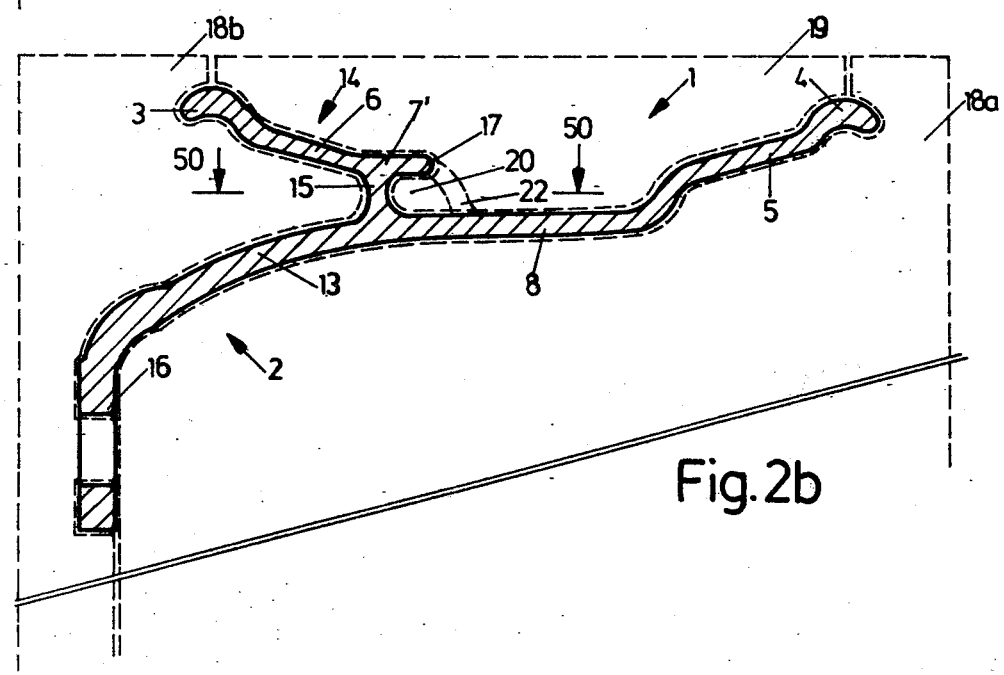
FIG. 2B is a partial side elevation, in section, along line 51—51 of FIG. 3.

FIGS. 2A and 2B show profiles of a wheel in accordance with the present invention, the two views being taken along radii angularly offset from each other so that the section of FIG. 2A passes through approximately the center of a hand-hole while FIG. 2B shows a section extending through a portion 13 which separates the hand-holes from each other. In these figures, the same reference numerals are used for those parts which are the same as the prior art device of FIG. 1.

It will be observed that the section of FIG. 2A is substantially the same as that of FIGS. 1. In this particular region of the mold, there is no danger of the sand mold being too narrow since the sand bodies 18A, 18B extend through the hand-holes and, thus, have adequate thickness. However, in FIG. 2B, wherein the section is arranged so that it extends through the intermediate part 13 between hand-holes, the profile looks entirely different. The contours of the surface facing the tire in the regions of the left and right tips, and most of the left and right 15° cones, and a portion of shoulder 7' and the right hand portion of drop-center 8, these shapes are essentially the same as in FIG. 2A. However, the point of connection of the pan is no longer at drop-center 8, as is the case with the section through the hand-hole, but instead the pan is connected by a crosspiece 15 directly with shoulder 7'. Shoulder 7' now, however, does not extend or merge directly into an inclined element 22 leading to drop-center 8 but, rather, consists only of a lobe 17 which projects axially beyond crosspiece 15 which is so formed that the outside of the shoulder, seen from around its periphery, consists of the lobe 14 and area 14' extending into the drop-center, and is circularly symmetrical. On the side of the rim turned toward the tire, pockets are formed under lobes 17, and these pockets are filled by the annular core 19 during casting. The advantage found in casting a wheel of this sort, therefore, resides in that the annular chamber which is filled up with sand, which exists when pan 2 is mounted directly on shoulder 7', is filled up alternately by the thick sand mold 18B, which is quite adequate in the hand-hole area, and by the annular core 19 in the intermediate portions 14 on the other side, so that the entire casting surface of the rim is guided such that the annular chamber lies first under lobe 17 and, therefore, on the compressed air side of the rim, and then under the radial area 14 of the shoulder, and therefore outside of the compressed air chamber. The inside of the pan engages on sand mold 18A.

Chambers 20 under lobe 17 can receive weights.

Figure 3:
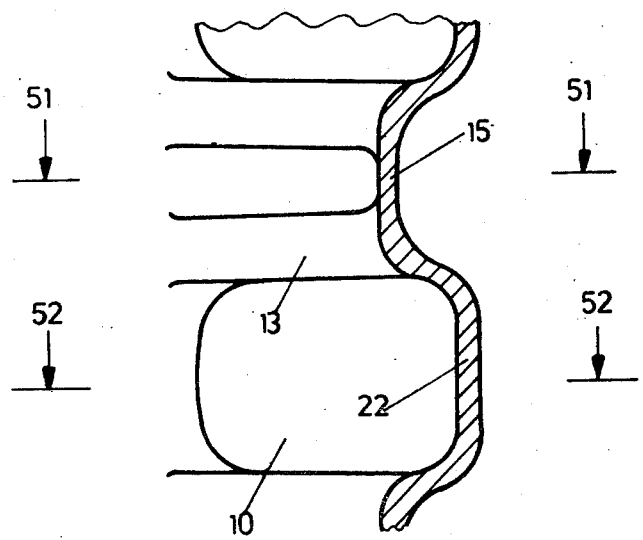
FIG. 3 is a partial plan view, in section, along lines 50—50 of FIGS. 2A and 2B.

FIG. 3 shows a partial side elevation, in partial section, along line 50—50. As seen therein, the "wavey" line forming the cross-section illustrates the essentially vertical passage of the crosspiece 15 which constitutes a wall axially alternating in correspondence with the hand-holes and the intermediate portions 13, forming inclined elements 22 between the pan and rim on the one hand and between the shoulder and drop-center on the other hand. The connection of the rim to the pan extends in the radial area of the rim with the hand holes over inclined element 22 (FIG. 2A) and in the intermediate parts 13 the connection extends through crosspiece 15, so that the connection between rim and pan in the hand-hole areas exists only theoretically since here there is no material connection between the rim and pan through the hand-hole. However, the fact that drop-center 8 can serve as a continuation of the pan profile provides for a true interconnection.

While certain advantageous embodiments have been chosen to illustrate the invention it will be understood by those skilled in the art that various changes and modifications can be made therein without departing from the scope of the invention as defined in the appended claims.

What is claimed is:

1. An improved cast vehicle wheel, particularly for use with tubeless tires, of the type having the unitarily formed combination of a rim portion, an axially offset pan and a flat annular flange, wherein the rim portion has a drop-center portion with conical surface portions extending outwardly from both sides thereof and with a shoulder formed between the drop-center portion and one of the conical portions, and wherein the pan interconnects the flat annular flange and the rim portion and includes means defining hand-holes therethrough, the improvement wherein the shoulder is formed between the drop-center portion and the one conical portion on the same side as the axially offset pan and flange, intermediate portions of the pan between said handholes are shaped to merge into the rim portion, and an annular wall portion extends generally radially about the wheel axis and connects the shoulder with the drop-center portion and the intermediate portions of the pan, the wall portion undulating in directions substantially parallel to the wheel axis.

2. A vehicle wheel according to claim 1 wherein said pan is formed to connect with said rim portion only by said intermediate portions.

3. A vehicle wheel according to claim 2 wherein said wall portion is formed with axially alternating regions coincident with said hand holes, forming radial crosspieces circularly coincident with said intermediate portions, said shoulder forming, between said hand-holes, axially extending overhanging lobes protruding toward said drop-center portion defining pockets radially inwardly thereof.

4. A vehicle wheel according to claim 3 formed from a ductile material.

5. A vehicle wheel according to claim 3 wherein said overhanging lobes and said drop-center define pockets to receive weights.

6. A vehicle wheel according to claim 4 wherein said ductile material is nodular cast iron.

7. A vehicle wheel according to claim 4 wherein said ductile material is aluminum alloy.

8. A vehicle wheel according to claim 1 wherein said wall portion is formed with axially alternating regions coincident with said hand holes, forming radial crosspieces circularly coincident with said intermediate portions, said shoulder forming, between said hand-holes, axially extending overhanging lobes protruding toward said drop-center portion defining pockets radially inwardly thereof.

* * * * *